US012808339B2

(12) United States Patent
Louven et al.

(10) Patent No.: US 12,808,339 B2
(45) Date of Patent: Nov. 24, 2026

(54) METHOD FOR OPERATING AN INTERNAL COMBUSTION ENGINE, AND INTERNAL COMBUSTION ENGINE

(71) Applicant: Ford Global Technologies, LLC, Dearborn, MI (US)

(72) Inventors: Georg Louven, Neuwied (DE); Rainer Kiehn, Frechen (DE); Helmut Hans Ruhland, Eschweiler (DE); Krystian Dylong, Cologne (DE); Guenter Grosch, Vettweiss (DE)

(73) Assignee: Ford Global Technologies, LLC, Dearborn, MI (US)

( * ) Notice: Subject to any disclaimer, the term of this patent is extended or adjusted under 35 U.S.C. 154(b) by 638 days.

(21) Appl. No.: 18/176,865

(22) Filed: Mar. 1, 2023

(65) Prior Publication Data

US 2023/0358188 A1 Nov. 9, 2023

(30) Foreign Application Priority Data

Mar. 31, 2022 (DE) ......................... 102022107668.7

(51) Int. Cl.

*F02D 41/40* (2006.01)
*F02D 41/00* (2006.01)
*F02D 41/38* (2006.01)

(52) U.S. Cl.

CPC ....... *F02D 41/401* (2013.01); *F02D 41/0007* (2013.01); *F02D 41/0027* (2013.01); *F02D 41/0052* (2013.01); *F02D 41/009* (2013.01); *F02D 2041/389* (2013.01); *F02D 2200/0602* (2013.01); *F02D 2200/0614* (2013.01); *F02D 2200/10* (2013.01); *F02D 2200/101* (2013.01)

(58) Field of Classification Search

CPC ........... F02D 2200/1012; F02D 19/024; F02D 2041/389; F02D 2200/0602; F02D 2200/0614; F02D 2200/10; F02D 2200/101; F02D 37/02; F02D 41/00; F02D 41/0007; F02D 41/0027; F02D 41/0052; F02D 41/009; F02D 41/401; F02P 5/045; F02M 21/02

See application file for complete search history.

(56) References Cited

U.S. PATENT DOCUMENTS

| | | | | |
|---|---|---|---|---|
| 2,093,339 A * | 9/1937 | Pipping | F02M 69/00 | 123/285 |
| 5,964,199 A * | 10/1999 | Atago | F02D 41/40 | 123/305 |
| 6,736,107 B1 * | 5/2004 | Grajkowski | F02D 41/062 | 123/305 |
| 7,320,302 B2 * | 1/2008 | Kobayashi | F02D 19/081 | 123/305 |

(Continued)

FOREIGN PATENT DOCUMENTS

| | | |
|---|---|---|
| CN | 101260846 A | 9/2008 |
| EP | 0756082 A2 | 1/1997 |
| JP | 4406880 B2 | 2/2010 |

*Primary Examiner* — Carl C Staubach
(74) *Attorney, Agent, or Firm* — McCoy Russell LLP

(57) ABSTRACT

Methods and systems are provided for an engine system. In one example, a method includes adjusting an opening and a closing time of a fuel injector in response to an ignition time of a combustion mixture. The adjusting may include a threshold margin as a further parameter for adjusting the opening and the closing time.

10 Claims, 5 Drawing Sheets

(56) References Cited

U.S. PATENT DOCUMENTS

| | | | | |
|---|---|---|---|---|
| 2012/0255531 | A1 * | 10/2012 | Kinose | F02D 41/0085 123/673 |
| 2018/0010540 | A1 * | 1/2018 | Suzuki | F01N 3/101 |

* cited by examiner

METHOD FOR OPERATING AN INTERNAL COMBUSTION ENGINE, AND INTERNAL COMBUSTION ENGINE

CROSS REFERENCE TO RELATED APPLICATION

The present application claims priority to German Patent Application No. 102022107668.7 filed on Mar. 31, 2022. The entire contents of the above-listed application is hereby incorporated by reference for all purposes.

FIELD

The present description relates generally to a method for operating an internal combustion engine, wherein a gaseous fuel is injected into at least one combustion chamber of the internal combustion engine during an injection period by means of at least one injection nozzle, and a fuel-air mixture situated in the combustion chamber is ignited after the expiry of a period commencing at an end point in time of the injection period. The invention furthermore relates to an internal combustion engine having at least one injection system for injecting a gaseous fuel into at least one combustion chamber of the internal combustion engine during an injection period by means of at least one injection nozzle, and having at least one electronics unit, wherein the electronics unit is configured to actuate an ignition device of the internal combustion engine such that a fuel-air mixture that is situated in the combustion chamber is ignited after the expiry of a period commencing at an end point in time of the injection period.

BACKGROUND/SUMMARY

As government regulations against emissions, manufacturers continue to modify engine systems to decrease greenhouse emissions. One example modification may include providing multiple fuels to a combustion chamber, wherein one or more of the fuels may include a reduced carbon-content or no carbon. Injectors for alternative fuels, which may include fuels different than gasoline and diesel, may be prone to degradation. Gases injected by the injectors may experience back fire through a nozzle due to a prolonged combustion phase. Additionally, a closing time of the injector is non-linear due to a fuel rail pressure, wherein combustion may occur while the valve is still closing, resulting in back fire.

U.S. Pat. No. 7,320,302B2 discloses an internal combustion engine, in the combustion chamber of which a mixture of fuel and air is compressed and combusted in order to generate power. The internal combustion engine has a mechanism for compressing the air/fuel mixture in the combustion chamber, a module for generating a first fuel/air mixture from a first fuel and air in a particular ratio, which fuel/air mixture does not autoignite when compressed in the combustion chamber by the compression mechanism, a module for injecting a second fuel, which differs from the first fuel, into a subregion of the combustion chamber for the purposes of generating a second fuel/air mixture, and a module for igniting the second fuel/air mixture in order to compress the first fuel/air mixture and in so doing trigger autoignition of said mixture. The second fuel that is to be injected by the injection module in order to generate the second fuel/air mixture is hydrogen gas.

EP 0 756 082 B1 discloses an internal combustion engine assembly with an internal combustion engine with a machine block that has at least one cylinder, a piston that is mounted within the cylinder for a reciprocating movement in the cylinder, a fuel injector for injecting fuel into the cylinder, and a circuit for generating an injection control signal that indicates a fuel injection event and for generating a spark in the cylinder after a specified length of time has elapsed since the injection control signal was generated. This circuit has a timer with a timer output for generating an electrical timing signal, a microprocessor with an injector output for generating the injection control signal, and a device for generating a spark signal. The timing signal has a specified duration that indicates a length of time that has elapsed since the injection control signal was generated. The injector output is connected to the timer in order to initiate the timing signal. The circuit furthermore has an AND gate that receives the timing signal and the spark signal. The AND gate generates an ignition current in response to both the timing signal and the spark signal being received.

JP 4 406 880 B2 discloses an engine control unit for controlling a combustion engine in which hydrogen is introduced directly into a combustion chamber and combusted therein. If it is identified that conditions for a torque drop exist, a point in time for a hydrogen injection is, in the presence of high rotational speed and high load, advanced from a compression stroke to an intake stroke in order to lower the drive torque of the combustion engine.

CN 101 260 846 B discloses a method for injecting hydrogen into a combustion engine in a manner dependent on an operating state of the combustion engine. When the combustion engine is under full load, the combustion gas is injected directly into the respective cylinder after an induction of air has been ended, with an ignition point in time being correspondingly delayed.

Modern injection nozzle designs for injecting gaseous alternative fuels into combustion engines have shortcomings. In particular, the injection nozzles are damaged owing to so-called backfiring through their respective nozzle. The backfiring results from a very long combustion phase, such as is typical for natural gas (CNG) or hydrogen ($H_2$), for example. Since, owing to pressure differences across the injection nozzle, the gaseous fuel cannot be injected into a cylinder of the internal combustion engine during a compression phase of the cylinder, the gaseous fuel must be injected into the cylinder after an inlet valve of the cylinder is closed. The injection is however normally of longer duration when using gaseous alternative fuels than when using liquid fuels. A closing phase of the injection nozzle also requires a much greater length of time in order for the injection nozzle to be returned into its fully closed state. Furthermore, the closing behavior of an injection nozzle is not linear, because a closing force of the injection nozzle is dependent on the present pressure upstream of the injection nozzle. The injection nozzle is often not yet closed, such that a combustion of the gaseous fuel that has been injected into the cylinder commences toward the end of the injection owing to an ignition occurring at a very close point in time. This results in backfiring and in damage to the injection nozzle.

Thus, it may be desired to have a strategy for protecting injection nozzles for injecting gaseous alternative fuels into combustion engines. In one example, a method may include a length of the period is electronically determined during operation of the internal combustion engine taking into consideration at least one parameter of the internal combustion engine and/or at least one parameter of the injection nozzle.

In one example, a method may include adjusting an opening time and a closing time of a fuel injector in response to an ignition time of a combustion mixture of a combustion chamber of an engine, wherein the fuel injector is positioned to supply fuel to the combustion chamber.

Note that the features and measures individually specified in the following description may be combined with one another in any technically meaningful way and reveal further refinements of the invention. The description additionally characterizes and specifies the invention, in particular in conjunction with the figures. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
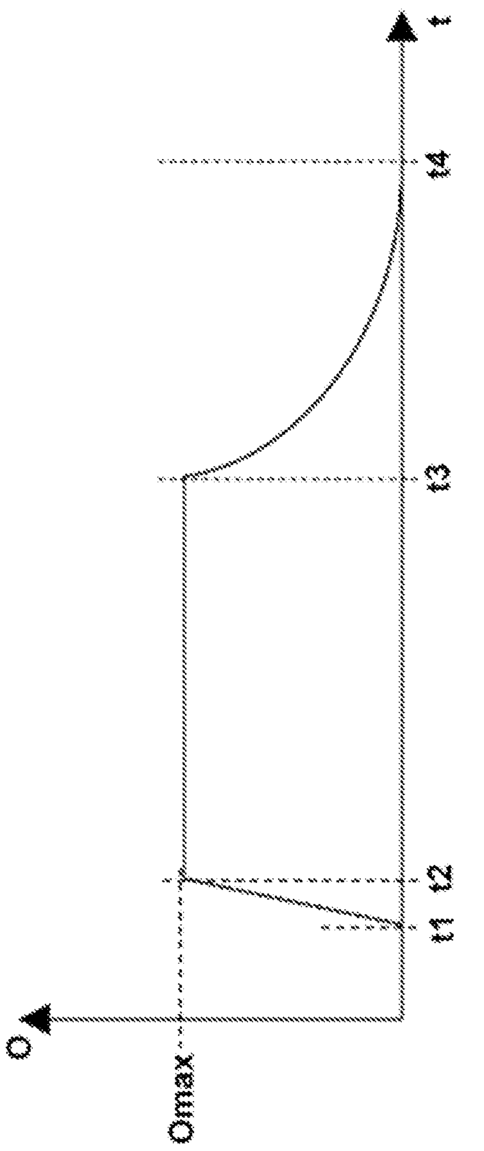
FIG. 1 shows a diagram of a closing behavior of an injection nozzle for injecting a gaseous fuel.

The following description relates to systems and methods for a gaseous fuel injector. According to the disclosure, the length of the period commencing at the end point in time of the injection may be varied in a manner dependent on at least one parameter of the internal combustion engine and/or at least one parameter of the injection nozzle. It can thus be ensured that, proceeding from the end point in time of the injection period, which is defined by the presence of an electrical injection stop signal, a period within which the injection nozzle can be fully closed is available before the fuel-air mixture in the combustion chamber is ignited. This prevents the injection nozzle from still being partially open at the point in time of the ignition, as a result of which backfiring into the open injection nozzle, and resulting degradation to the injection nozzle, is reliably prevented.

With the disclosure, the length of the period of time can be electronically determined during operation of the internal combustion engine taking into consideration at least one parameter of the internal combustion engine and/or at least one parameter of the injection nozzle, and used for controlling the internal combustion engine. The respective parameter may be a constant parameter or a variable parameter, for example an operating parameter.

A closing time of the injection nozzle, which commences at the end point in time of the injection period, can be regarded as the time required by the injection nozzle to be fully closed after the injection period, for example after a reverse voltage has been electrically applied to the injection nozzle for closing purposes. The closing time is very highly dependent inter alia on the construction or design of the injection nozzle, because the gaseous fuel or the gas pressure presently acting on the injection nozzle can assist or impede the closing operation of the injection nozzle depending on the design. The closing time is therefore also highly dependent on the gas pressure presently prevailing at the injection nozzle. Depending on the variant of internal combustion engine, the gas pressure may in turn be varied in a manner dependent on a load presently acting on the internal combustion engine and/or a present rotational speed of the internal combustion engine. In this way, the closing time cannot be represented simply as a function dependent on rotational speed, for example.

The disclosure introduces a new protection parameter for the injection nozzle, which can be implemented for example in an engine control unit as an application value. Since the closing time of the injection nozzle is not a function of the crank angle, the engine control unit can translate two additional timing parameters onto the crankshaft, firstly the time for actually fully closing the injection nozzle, and secondly an additional safety time for ensuring that the combustion does not commence prior to the ignition. The safety time may for example be approximately 0.5 ms.

The length of the period after the expiry of which the air-fuel mixture situated in the combustion chamber is ignited may for example lie in a range from approximately 0.1 ms to approximately 5 ms, and may be in particular approximately 3 ms.

The gaseous fuel may for example be a gaseous alternative fuel, for example natural gas or hydrogen.

In one embodiment, the length of the period is electronically determined during the operation of the internal combustion engine taking into consideration an injection pressure presently prevailing at the injection nozzle and/or a present pressure drop across the injection nozzle and/or a pressure profile within the combustion chamber and/or a specified closing time of the injection nozzle and/or a design of the injection nozzle and/or an aging state of the injection nozzle and/or a load presently acting on the internal combustion engine and/or a present rotational speed of the internal combustion engine. Each of these parameters can have an influence on the actual closing time of the injection nozzle.

In a further embodiment, the length of the period is electronically determined during the operation of the internal combustion engine using a characteristic map which contains a relationship between the length of the period, on the one hand, and the pressure drop across the injection nozzle and the load presently acting on the internal combustion engine and/or the present rotational speed of the internal combustion engine, on the other hand. The characteristic map may for example be stored in an engine controller.

A controller with instructions stored on memory thereof may be configured to determine a length of the period during operation of the internal combustion engine taking into consideration at least one parameter of the internal combustion engine and/or at least one parameter of the injection nozzle.

The advantages mentioned above with regard to the method are correspondingly associated with the internal combustion engine. In particular, the internal combustion engine can be used to carry out the method according to any one of the abovementioned refinements or according to a combination of at least two of said refinements with one another. The electronics unit may be implemented by an engine controller or independently thereof.

In one example, the electronics unit is configured to determine the length of the period during the operation of the internal combustion engine taking into consideration an injection pressure presently prevailing at the injection nozzle and/or a present pressure drop across the injection nozzle and/or a pressure profile within the combustion chamber and/or a specified closing time of the injection nozzle and/or a design of the injection nozzle and/or an aging state of the injection nozzle and/or a load presently acting on the internal combustion engine and/or a present rotational speed of the internal combustion engine. Each of these parameters can have an influence on the actual closing time of the injection nozzle.

In a further embodiment, the electronics unit is configured to determine the length of the period during the operation of the internal combustion engine using a characteristic map which contains a relationship between the length of the period, on the one hand, and the pressure drop across the injection nozzle and the load presently acting on the internal combustion engine and/or the present rotational speed of the internal combustion engine, on the other hand.

Figure 3:
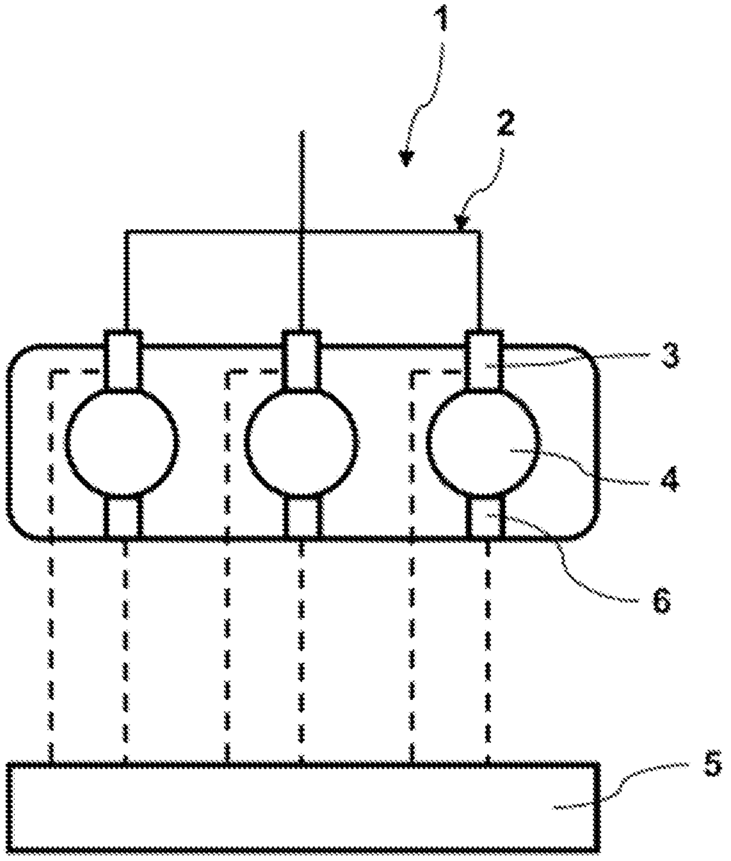
FIG. 3 is a schematic illustration of an exemplary embodiment for an internal combustion engine according to the disclosure.
Figure 4:
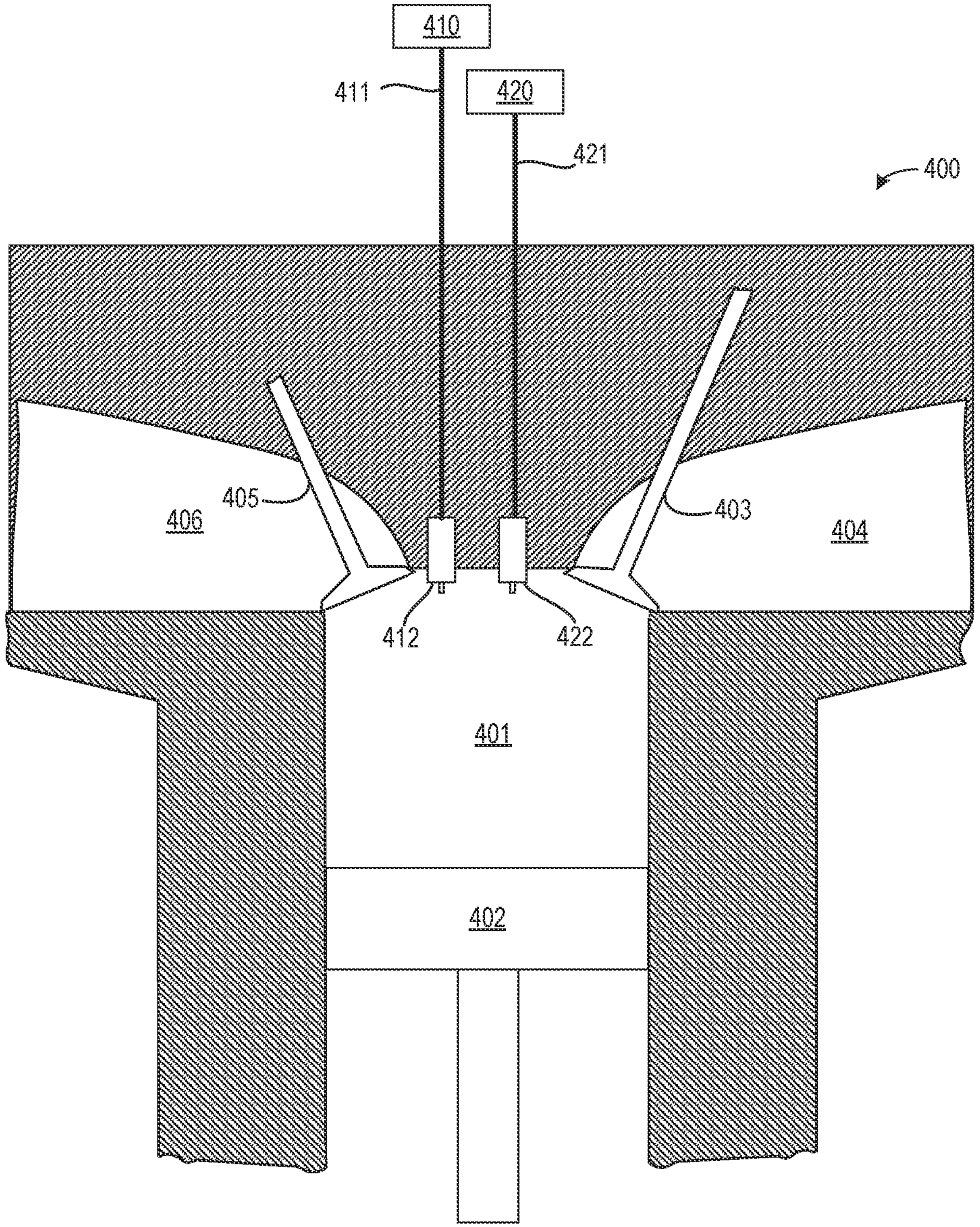
FIG. 4 is a schematic of a combustion chamber comprising multiple injectors configured to supply different fuels.

FIGS. 3 and 4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

In the various figures, identical parts are always denoted by the same reference designations, for which reason said parts will generally also be described only once.

FIG. 1 shows a diagram of a closing behavior of an injection nozzle for injecting a gaseous fuel. The opening state O of the injection nozzle is plotted versus the time t.

At the point in time t1, there is an injection start signal, whereby an opening of the injection nozzle is initiated. At the point in time t2, the injection nozzle has been fully opened and is situated in its maximum opening state Omax. At the point in time t3, there is an injection stop signal, whereby a closure of the injection nozzle is initiated. At the point in time t4, the injection nozzle has been fully closed. The closing behavior of the injection nozzle between the points in time t3 and t4 is non-linear, which may be due to an opposing pressure to which the injection nozzle is subjected by the gaseous fuel. The ignition of a fuel-air mixture that is generated by the injection operation may occur only after the point in time t4 in order to mitigate backfiring into the injection nozzle.

Figure 2:
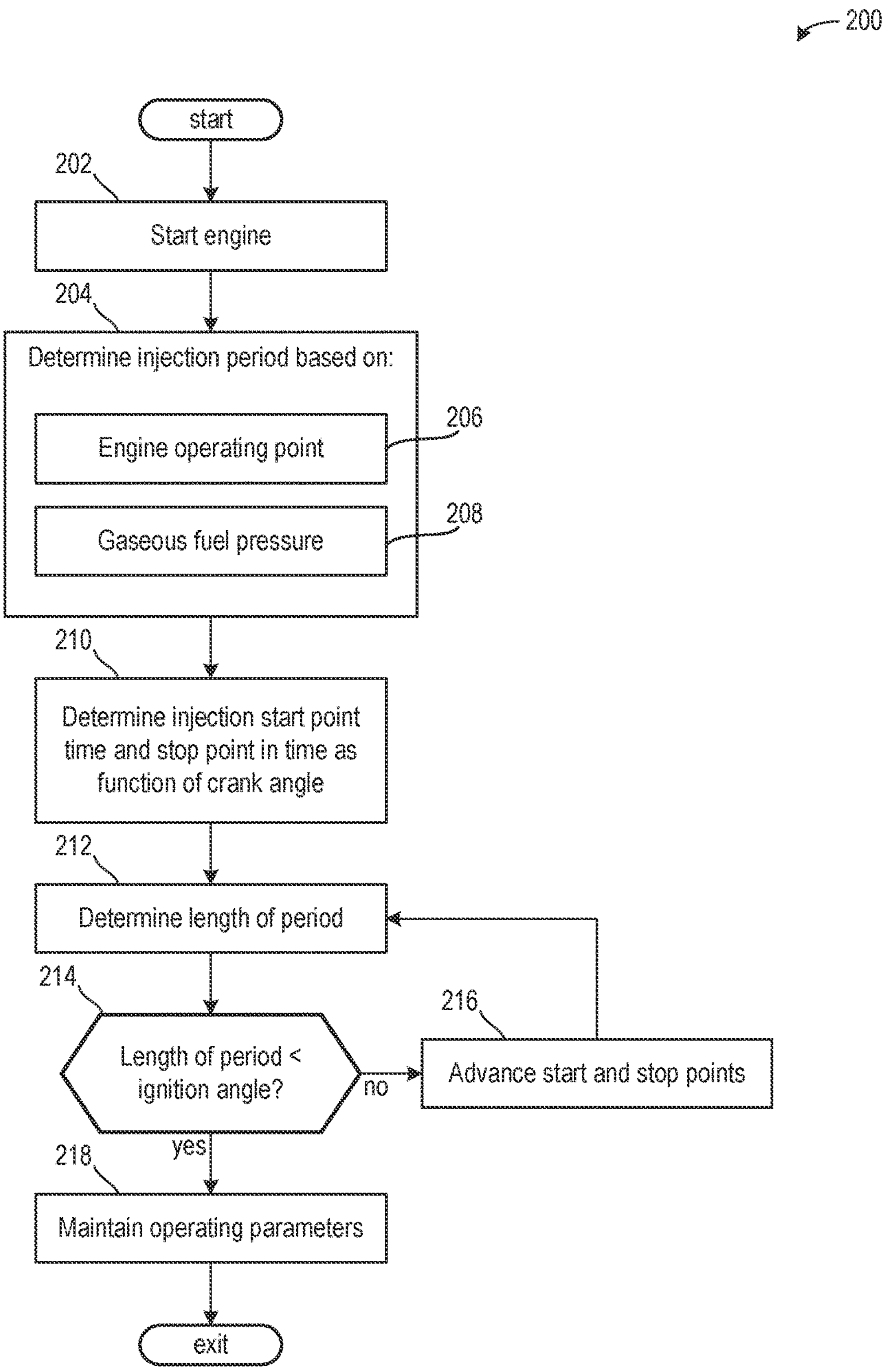
FIG. 2 shows a flow diagram of an exemplary embodiment for a method according to the disclosure.

FIG. 2 shows a flow diagram of an exemplary embodiment for a method 200 according to the disclosure for operating an internal combustion engine, wherein a gaseous fuel is injected into at least one combustion chamber of the internal combustion engine during an injection period via at least one injection nozzle, and a fuel-air mixture situated in the combustion chamber is ignited after the expiry of a period commencing at an end point in time of the injection period. Instructions for carrying out method may be executed by an electronic unit (e.g., a controller) based on instructions stored on a memory of the electronic unit and in conjunction with signals received from sensors of the engine system, such as the sensors described above with reference to FIG. 1. The electronic unit may employ engine actuators of the engine system to adjust engine operation, according to the method described below.

The method 200 begins at 202, which includes starting the internal combustion engine.

At 204, the method includes determining the length of the injection period. The length of the injection period may be at least partially based on one or more of an operating point 206 of the internal combustion engine and a pressure 208 to which the injection nozzle is subjected by the gaseous fuel. The operating point 206 may include one or more of an engine load, an engine speed, an engine temperature, an air/fuel ratio, an amount of the liquid fuel provided to the combustion mixture, an amount of the gaseous fuel provided to the combustion mixture, an exhaust gas recirculation (EGR) mass flow rate, an ignition timing, and a number of injections.

At 210, the method may include determining an injection start point in time and an injection stop point in time as functions of a crank angle. In one example, the injection start point time begins at t2 of FIG. 1 and ends at t3 of FIG. 1. In some examples, additionally or alternatively, the start point in time may be near t2 and the injection stop point may be near t3.

At 212, the method may include determining the length of the period between the stop time of the injection and a start of an ignition of the air-fuel mixture. The time may be converted to a function of the crank angle taking into consideration at least one parameter of the internal combustion engine and/or at least one parameter of the injection nozzle.

Additionally or alternatively, the length of the period may be electronically determined taking into consideration one or more of an injection pressure presently prevailing at the injection nozzle, a present pressure drop across the injection nozzle, a pressure profile within the combustion chamber, a specified closing time of the injection nozzle, a design of the injection nozzle, an aging state of the injection nozzle, a load presently acting on the internal combustion engine, and a present rotational speed of the internal combustion engine.

In some embodiments, the length of the period may be electronically determined using a characteristic map which contains a relationship between the length of the period, on the one hand, and the pressure drop across the injection nozzle and the load presently acting on the internal combustion engine and/or the present rotational speed of the internal combustion engine, on the other hand.

At 214, the method may include determining if the length of the period is less than an ignition angle. That is to say, the method determines if the length of period ends at or after ignition of the combustion mixture starts. If the period of time is not less than the ignition angle, then the gaseous fuel injector is closing at or after the start of ignition, which may result in back fire and degradation of the gaseous fuel injector. At 216, the method may include advancing the injection start point in time and the injection stop point in time to an earlier time. In one example, the advancing may be based on a fixed crank angle or a fixed amount of time. Additionally or alternatively, the advancing may be based on equation 1 below.

$$t_{adj}=t_v-t_i-t_m \qquad \text{Equation 1}$$

In equation 1, $t_{adj}$ represents a time adjusted to be executed on the opening and closing time of the gaseous injector. $t_v$ represents the length of period of the injector, $t_i$ represents an ignition angle, and $t_m$ represents a margin of time. The margin of time may be added as a buffer to further decrease a likelihood of back fire reaching or occurring at the gaseous injector. By including the margin of time, the injector may be closed prior to the start of ignition by an amount of time equal to the margin of time.

The method may return to 212 to determine the length of period to determine if the injector is close d prior to the start of ignition.

If at 214 the method determines that the length of period is less than the ignition angle, then the gaseous fuel injector may be closing prior to the start of ignition. Additionally or alternatively, the gaseous fuel injector may be closing with a threshold margin between the closing time and the start of ignition to further mitigate back fire degrading the gaseous injector. At 218, the method may include maintaining operating parameters as the gaseous fuel injector is injecting a determined amount of fuel and closing prior to the ignition time by at least the threshold margin.

FIG. 3 is a schematic illustration of an exemplary embodiment for an internal combustion engine 1 according to the disclosure, having an injection system 2 for injecting a gaseous fuel into at least one combustion chamber 4 of the internal combustion engine 1 during an injection period via at least one injection nozzle 3, and having at least one electronics unit 5. In one example, the electronics unit 5 is a controller comprising memory with computer readable instructions stored thereon for executing the steps of the method of FIG. 2.

The electronics unit 5 is configured to actuate an ignition device 6 of the internal combustion engine 1 such that a fuel-air mixture situated in the combustion chamber 4 is ignited after the expiry of a period commencing at an end point in time of the injection period.

Furthermore, the electronics unit 5 is configured to determine a length of the period during operation of the internal combustion engine 1 taking into consideration at least one parameter of the internal combustion engine 1 and/or at least one parameter of the injection nozzle 3.

Furthermore, the electronics unit 5 is configured to determine the length of the period during the operation of the internal combustion engine 1 taking into consideration an injection pressure presently prevailing at the injection nozzle 3 and/or a present pressure drop across the injection nozzle 3 and/or a pressure profile within the combustion chamber 4 and/or a specified closing time of the injection nozzle 3 and/or a design of the injection nozzle 3 and/or an aging state of the injection nozzle 3 and/or a load presently acting on the internal combustion engine 1 and/or a present rotational speed of the internal combustion engine 1. The engine 1 may further include a second fuel system configured to contain and provide a liquid fuel to the combustion chamber 4. In one example, the injection system 2 is configured to provide a gaseous fuel and the second fuel system is configured to provide a liquid fuel via a separate fuel rail and injectors.

Furthermore, the electronics unit 5 is configured to determine the length of the period during the operation of the internal combustion engine 1 using a characteristic map which contains a relationship between the length of the period, on the one hand, and the pressure drop across the injection nozzle 3 and the load presently acting on the internal combustion engine 1 and/or the present rotational speed of the internal combustion engine 1, on the other hand.

The electronics unit 5 may signal to an actuator of the injection nozzle 3 to open and close at different times. As such, an amount of fuel delivered to the at least one combustion chamber 4 from the injection nozzle 3 may be maintained as each of the opening time and the closing time of the injection nozzle 3 are adjusted equally.

During some conditions, if an ignition timing is too close to the closing of the injection nozzle 3 such that the opening and closing times of the injection nozzle 3 may not be further adjusted, then an ignitability of the combustion mixture may be adjusted. For example, an amount of EGR may be adjusted, a temperature of the EGR may be adjusted, a fuel injection amount of a liquid fuel may be adjusted, an ignition timing may be adjusted, an injection timing of the liquid fuel may be adjusted, and/or a mass of boost air may be adjusted.

Turning now to FIG. 4, it shows an example cylinder 401 of an engine 400. The engine 400 may be a non-limiting example of the engine e1 of FIG. 3. The cylinder may be one of a plurality of cylinders that each include at least one intake valve 403, at least one exhaust valve 405. Each of the plurality of cylinders may include a first injector 412 and aa second injector 422. Each fuel injector may include an actuator that may be actuated via a signal from the controller (e.g., electronic unit 5 of FIG. 3) of the engine. The cylinders of the engine may receive fuel from one or more fuel systems based on operating conditions. The fuel systems may include one or more fuel lines fluidly coupling a fuel tank, a pump, and a fuel rail to one or more of the direct injector and the port injector. More specifically, the first injector may receive fuel from a first fuel system 410 via a first fuel conduit 411. The second injector may receive fuel from a second fuel system 420 via a second fuel conduit 421. The first fuel system may supply a carbon-containing fuel and the second fuel system may supply a carbon-free fuel, in one example. The carbon-containing fuel may include one or more of gasoline, diesel, biodiesel, natural gas, HDRD, ether, syn-gas, kerosene, and alcohol. The carbon-free fuel may include one or more of ammonia, hydrogen, and water. In some examples, the engine may be a spark-free engine. In other examples, the engine may be a spark-ignited engine.

In one example, the engine may combust one or more fuel types delivered thereto. For example, the first injector may inject the first fuel directly to the cylinder and the second injector may inject the second fuel directly into cylinder. In one example, the first fuel is injected as a liquid fuel and the second fuel is injected as a gaseous fuel. The first fuel and second fuel may mix within an interior volume of the cylinder defined by cylinder walls, a cylinder head, and the piston 402. Following combustion, the exhaust valve may expel combustion products from the cylinder to an exhaust port 406.

During operation, each cylinder within the engine may use a four stroke cycle via actuation of the piston along an axis. The cycle includes the intake stroke, compression stroke, expansion stroke, and exhaust stroke. During the intake stroke, generally, the exhaust valve closes and the intake valve opens. Air is introduced into the combustion chamber via the intake manifold, and the piston moves to the bottom of the cylinder so as to increase the volume within the combustion chamber. A port-injection may occur during the intake stroke. The position at which the piston is near the bottom of the cylinder and at the end of its stroke (e.g. when the combustion chamber is at its largest volume) is typically referred to by those of skill in the art as bottom dead center (BDC). During the compression stroke, the intake valve and the exhaust valve are closed. The piston moves toward the cylinder head so as to compress the air within the combustion chamber. The point at which piston is at the end of its stroke and closest to the cylinder head (e.g. when the combustion chamber is at its smallest volume) is typically referred to by those of skill in the art as top dead center (TDC). In a process hereinafter referred to as direct injection, fuel is introduced into the combustion chamber. In some examples, fuel may be injected to the cylinder a plurality of times during a single cylinder cycle. The times may be converted as a function of crank angles, which may allow the controller to adjust the fuel injector operation. In a process hereinafter referred to as ignition, the injected fuel is ignited by compression ignition resulting in combustion. Additionally or alternatively, an ignition device may be positioned to supply spark to the combustion chamber to ignite the combustion mixture. During the expansion stroke, the expanding gases push the piston back to BDC. The crankshaft converts piston movement into a rotational torque of the rotary shaft. Finally, during the exhaust stroke, the exhaust valve opens to release the combusted air-fuel mixture to the exhaust manifold and the piston returns to TDC. Note that the above is described merely as an example, and that intake and exhaust valve opening and/or closing timings may vary, such as to provide positive or negative valve overlap, late intake valve closing, or various other examples. For example, a timing of the opening and/or closing of the intake and/or exhaust valves may be advanced to reduce a temperature of exhaust gases entering an aftertreatment system of the vehicle system, to increase an efficiency of the aftertreatment system. Further, in some examples a two-stroke cycle may be used rather than a four-stroke cycle.

An ignition timing of the engine may be adjusted via adjusting one or more of an intake valve timing, a fuel injection timing, a fuel temperature, a fuel pressure, an engine speed, an engine load, an air temperature, an engine temperature, a spark-timing, a boost pressure, and a manifold pressure. The ignition timing may be based on a position of the piston during the engine cycle and may be desired at or near TDC of a combustion stroke. A more advanced ignition timing may include where the ignition timing is moved prior to TDC of the combustion stroke and a more retarded ignition timing may include where the ignition timing is moved after TDC of the combustion stroke.

In another example of the present disclosure, an exhaust valve timing of the cylinders may be adjusted. In one example, the exhaust valve timing may be adjusted for a given cylinder such that a closing time of an exhaust valve during an exhaust stroke is advanced. Exhaust gases in the cylinder may be retained based on the advanced valve timing which includes the exhaust valve closing prior to completion of the exhaust stroke. By doing this, an EGR rate may be increased. In some examples, additionally or alternatively, the exhaust valve timing may be delayed such that the exhaust valve may be open with an intake valve of the cylinder during an intake stroke. By delaying the timing of exhaust valve closure, exhaust gases may be re-ingested into the cylinder. In one example, as the exhaust valve closure is more delayed, an amount of exhaust gas re-ingested into the cylinder increases, thereby increasing the EGR rate. Re-ingesting EGR may be desired during conditions where an EGR cooler condensate amount is relatively high and/or when an intake manifold temperature is relatively high.

Figure 5:
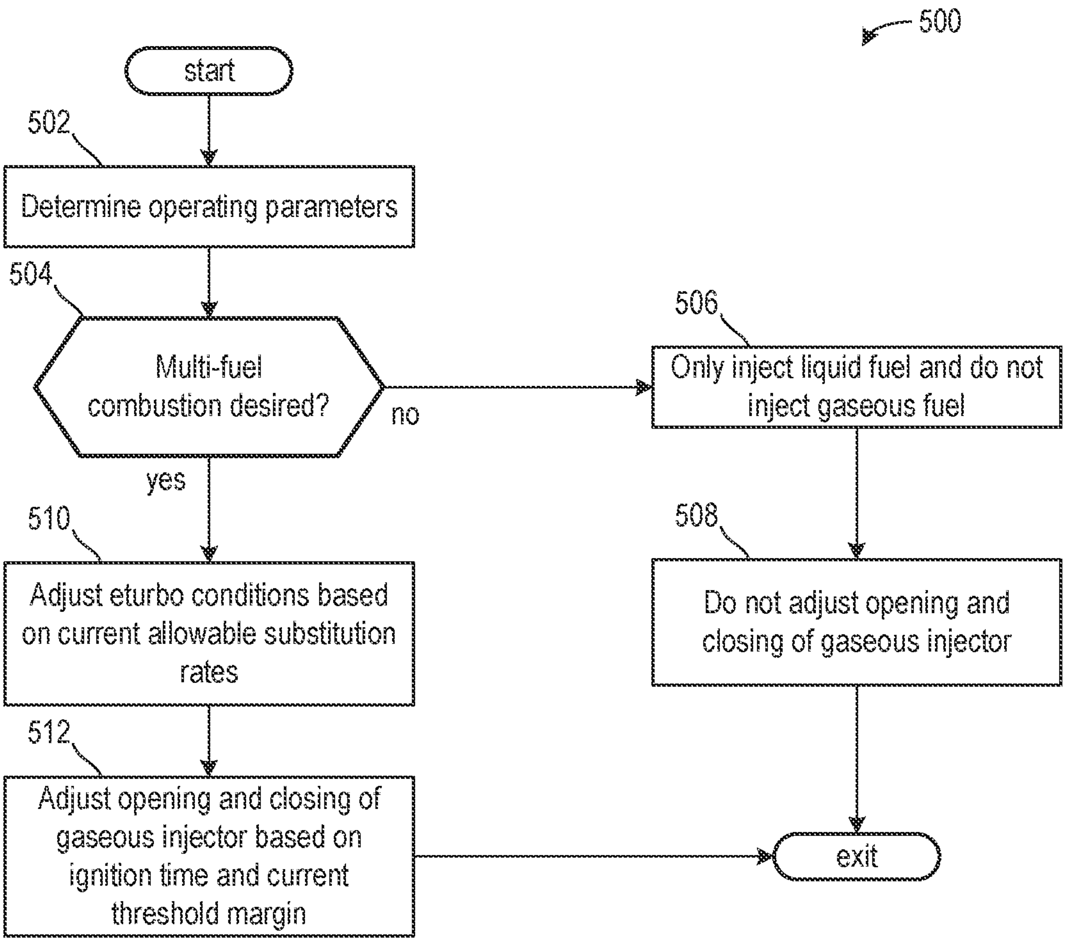
FIG. 5 shows a method for determining if multi-fuel combustion is desired.

Turning now to FIG. 5, it shows a method 500 for determining if multi-fuel combustion is desired. At 502, the method includes determining operating parameters. Operating parameters may include, but are not limited to, one or more of a manifold vacuum, an engine load, an engine temperature, an engine speed, and an air/fuel ratio.

At 504, the method 500 may include determining if multi-fuel combustion is desired. Multi-fuel combustion may decrease carbon emissions of the vehicle by increasing an amount of the second fuel and decreasing an amount of the first fuel. In one example, the multi-fuel combustion may include diesel as the primary fuel and hydrogen as the secondary fuel. Conditions that may impact multi-fuel combustion and a desired substitution rate may include engine airflow, engine load, intake manifold temperature, ambient pressure and temperature, exhaust manifold pressure, and the like. The desired substitution rate may be defined as a percentage of total engine fueling. For example, if the desired substitution rate is 60%, then 60% of total engine fueling may include the carbon-free fuel and 40% may include the carbon-containing fuel. As another example if the desired substitution rate is 85%, then 85% of the total engine fueling may include the carbon-free fuel and 15% may include the carbon-containing fuel. In one example, the amount of carbon-free fuel increases as the substitution rate increases.

If multi-fuel is not desired, then at 506, the method 500 may include only injecting the liquid fuel and not injecting the gaseous fuel. At 508, the method 500 may include not adjusting an opening and a closing time of the gaseous fuel injector.

If multi-fuel combustion is desired, then at 510, the method includes injecting the liquid fuel via the first injector and the gaseous fuel via the second injector. At 512, the method may include adjusting the opening and closing of the gaseous injector based on the ignition time and a current threshold margin. The current threshold margin may be based on one or more of an injection pressure, a pressure drop across the injection nozzle, a pressure profile of the combustion chamber, a time for the fuel injector to move to a closed position, an age of the fuel injector, a load of the engine, and a rotational speed of the engine.

Additionally or alternatively, the method may include adjusting an opening time and a closing time of the second fuel injector in response to an ignition time of a combustion mixture of a combustion chamber of an engine, wherein the gaseous fuel injector is positioned to supply fuel directly to the combustion chamber. The adjusting may include advancing the opening time and the closing time relative to the ignition time. The advancing further comprises executing the closing time before the ignition time by a margin of time (e.g., a threshold margin). The opening time, the closing time, and the ignition time are converted to crank angles, and wherein the margin of time may be based on a margin of crank angles. The threshold margin is increased in response to one or more of the injection pressure increasing, the pressure drop across the injection nozzle increasing, a pressure profile of the combustion chamber increasing, the time for the fuel injector to move to the closed position increasing, the age of the fuel injector increasing, the load of the engine increasing, and the rotational speed of the engine increasing.

The disclosure provides support for a method including adjusting an opening time and a closing time of a fuel injector in response to an ignition time of a combustion mixture of a combustion chamber of an engine, wherein the fuel injector is positioned to supply fuel to the combustion chamber. A first example of the method further includes where the adjusting comprises advancing the opening time and the closing time relative to the ignition time. A second example of the method, optionally including the first example, further includes where the advancing further comprises executing the closing time before the ignition time by a margin of time. A third example of the method, optionally including one or more of the previous examples, further includes where the opening time, the closing time, and the ignition time are converted to crank angles. A fourth example of the method, optionally including one or more of the previous examples, further includes where the fuel injector is a gaseous fuel injector. A fifth example of the method, optionally including one or more of the previous examples, further includes a liquid fuel injector configured to supply liquid fuel to the combustion chamber. A sixth example of the method, optionally including one or more of the previous examples, further includes an ignition device arranged in the combustion chamber.

The disclosure provides further support for a system including an engine comprising at least one combustion chamber, a fuel injector positioned to supply fuel to the at least one combustion chamber, and a controller with computer-readable instructions stored on memory thereof that cause the controller to determine an injection start point and stop point in time as a function of crank angle, determine a length of period between a close of the fuel injector and a start of an ignition time as a function of crank angle, and adjust the injection start point and stop point in response to the length of period being within a threshold margin of the ignition time. A first example of the system further includes where the instructions further enable the controller to adjust a combustion mixture in response to the injection start point and stop point being adjusted to a threshold advanced position. A second example of the system, optionally including the first example, further includes where the combustion mixture is adjusted to comprise one or more of a different amount exhaust gas recirculation (EGR), a different amount of gaseous fuel, a different amount of liquid fuel, and a different amount of boost. A third example of the system, optionally including one or more of the previous examples, further includes where the instructions cause the controller to maintain the injection start point and stop point in response to the length of period ending by at least the threshold margin prior to the ignition time. A fourth example of the system, optionally including one or more of the previous examples, further includes where the fuel injector is a gaseous fuel injector configured to inject one or more of hydrogen, compressed natural gas (CNG), ammonia, and syn-gas. A fifth example of the system, optionally including one or more of the previous examples, further includes where the threshold margin is a fixed value. A sixth example of the system, optionally including one or more of the previous examples, further includes where the threshold margin is a dynamic value based on one or more of a gaseous fuel pressure, a fuel injection amount, an ignition timing, an engine load, an age of the fuel injector, and an air/fuel ratio. A seventh example of the system, optionally including one or more of the previous examples, further includes where the instructions enable the controller to adjust the injection start point and stop point to an earlier crank angle, wherein the stop point occurs prior to the ignition time by at least the threshold margin.

The disclosure provides further support for a method including during an operating condition comprising supplying gaseous fuel to a combustion chamber via a fuel injector, advancing an opening time and a closing time of the fuel injector in response to an ignition time occurring at or within a threshold margin of the closing time. A first example of the method further includes where the threshold margin is based on one or more of an injection pressure, a pressure drop across the injection nozzle, a pressure profile of the combustion chamber, a time for the fuel injector to move to a closed position, an age of the fuel injector, a load of the engine, and a rotational speed of the engine. A second example of the method, optionally including the first example, further includes where the threshold margin is increased in response to one or more of the injection pressure increasing, the pressure drop across the injection nozzle increasing, a pressure profile of the combustion chamber increasing, the time for the fuel injector to move to the closed position increasing, the age of the fuel injector increasing, the load of the engine increasing, and the rotational speed of the engine increasing. A third example of the method, optionally including one or more of the previous examples, further includes where maintaining the opening time and the closing time when gaseous fuel is not supplied to the engine. A fourth example of the method, optionally including one or more of the previous examples, further includes injecting a gaseous fuel via the fuel injector directly into the combustion chamber.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:

an engine comprising at least one combustion chamber;

a fuel injector positioned to supply fuel to the at least one combustion chamber; and a controller with computer-readable instructions stored on memory thereof that cause the controller to:

determine an injection start point and stop point in time as a function of crank angle;

determine a length of period between a close of the fuel injector and a start of an ignition time as a function of crank angle; and adjust the injection start point and stop point based on the length of period, an ignition angle, and a margin of time in response to the injection ending within a threshold margin of the ignition time.

2. The system of claim 1, wherein the instructions further enable the controller to adjust a combustion mixture in response to the injection start point and stop point being adjusted to a threshold advanced position.

3. The system of claim 2, wherein the combustion mixture is adjusted to comprise one or more of a different amount exhaust gas recirculation (EGR), a different amount of gaseous fuel, a different amount of liquid fuel, and a different amount of boost.

4. The system of claim 1, wherein the instructions cause the controller to maintain the injection start point and stop point in response to the injection ending by at least the threshold margin prior to the ignition time.

5. The system of claim 1, wherein the fuel injector is a gaseous fuel injector configured to inject one or more of hydrogen, compressed natural gas (CNG), ammonia, and syn-gas.

6. The system of claim 1, wherein the threshold margin is a fixed value based on a crank angle.

7. The system of claim 1, wherein the threshold margin is a dynamic value based on one or more of a gaseous fuel pressure, a fuel injection amount, an ignition timing, an engine load, an age of the fuel injector, and an air/fuel ratio.

8. The system of claim 1, wherein the instructions enable the controller to adjust the injection start point and stop point to an earlier crank angle, wherein the stop point occurs prior to the ignition time by at least the threshold margin.

9. The system of claim 1, wherein the length of period is electronically determined based on one or more of an injection pressure presently prevailing at the injection nozzle, a present pressure drop across the injection nozzle, a pressure profile within the combustion chamber, a specified closing time of the injection nozzle, a design of the injection nozzle, an aging state of the injection nozzle, a load presently acting on the internal combustion engine, and a present rotational speed of the internal combustion engine.

10. The system of claim 1, wherein the length of period is determined using a characteristic map that comprises a relationship between the length of the period and the pressure drop across the injection nozzle and the load presently acting on the internal combustion engine and/or the present rotational speed of the internal combustion engine.

* * * * *